(12) United States Patent
Gordon et al.

(10) Patent No.: US 9,215,422 B2
(45) Date of Patent: Dec. 15, 2015

(54) VIDEO PROCESSING SYSTEM WITH CONDITIONAL ACCESS MODULE AND METHODS FOR USE THEREWITH

(75) Inventors: Stephen E. Gordon, Lexington, MA (US); Jeyhan Karaoguz, Irvine, CA (US); Sherman (Xuemin) Chen, San Diego, CA (US); Michael Dove, Los Gatos, CA (US); David Rosmann, Irvine, CA (US); Thomas J. Quigley, Franklin, NC (US)

(73) Assignee: BROADCOM CORPORATION, Irvine, CA (US)

( * ) Notice: Subject to any disclaimer, the term of this patent is extended or adjusted under 35 U.S.C. 154(b) by 1033 days.

(21) Appl. No.: 12/190,122

(22) Filed: Aug. 12, 2008

(65) Prior Publication Data

US 2009/0293083 A1 Nov. 26, 2009

Related U.S. Application Data

(60) Provisional application No. 61/054,722, filed on May 20, 2008.

(51) Int. Cl.
| | |
|---|---|
| *H04N 7/16* | (2011.01) |
| *H04N 7/167* | (2011.01) |
| *H04N 7/173* | (2011.01) |
| *H04N 21/266* | (2011.01) |
| *H04N 21/4623* | (2011.01) |
| *H04N 21/658* | (2011.01) |

(52) U.S. Cl.
CPC ........... *H04N 7/17318* (2013.01); *H04N 7/162* (2013.01); *H04N 21/26606* (2013.01); *H04N 21/4623* (2013.01); *H04N 21/6581* (2013.01)

(58) Field of Classification Search
USPC .................................................. 725/86–104
See application file for complete search history.

(56) References Cited

U.S. PATENT DOCUMENTS

| | | | |
|---|---|---|---|
| 5,583,937 A * | 12/1996 | Ullrich et al. ................. | 380/211 |
| 8,117,328 B2 * | 2/2012 | Choi et al. ..................... | 709/231 |
| 2001/0001024 A1 * | 5/2001 | Yanagihara et al. ............ | 386/75 |
| 2002/0083438 A1 * | 6/2002 | So et al. .......................... | 725/31 |
| 2003/0188316 A1 * | 10/2003 | DePrez ............................ | 725/87 |
| 2004/0143839 A1 * | 7/2004 | Gonzales-Caiazzo et al. . | 725/29 |
| 2005/0198673 A1 * | 9/2005 | Kit et al. ......................... | 725/68 |
| 2006/0048198 A1 * | 3/2006 | Hochmuth et al. ........... | 725/105 |
| 2006/0107285 A1 * | 5/2006 | Medvinsky ..................... | 725/25 |
| 2006/0168580 A1 * | 7/2006 | Harada et al. ................. | 717/174 |
| 2006/0174323 A1 * | 8/2006 | Brown et al. ..................... | 726/3 |
| 2006/0236353 A1 * | 10/2006 | Cheng et al. .................... | 725/90 |
| 2007/0250880 A1 * | 10/2007 | Hainline ......................... | 725/97 |
| 2007/0288623 A1 * | 12/2007 | Kato et al. ..................... | 709/223 |
| 2008/0184318 A1 * | 7/2008 | Horbury .......................... | 725/87 |
| 2009/0094654 A1 * | 4/2009 | Sullivan et al. ............... | 725/110 |
| 2009/0165031 A1 * | 6/2009 | Li et al. .......................... | 725/22 |
| 2009/0288171 A1 * | 11/2009 | Holwerda ....................... | 726/26 |
| 2013/0326019 A1 * | 12/2013 | Haff et al. ..................... | 709/217 |

\* cited by examiner

*Primary Examiner* — Mushfikh Alam
(74) *Attorney, Agent, or Firm* — Garlick & Markison; Bruce Stuckman

(57) ABSTRACT

A video processing system includes a video device that generates a request corresponding to video content. A conditional access module generates a video signal for transmission to the video device during a first time period, and terminates transmission of the video signal when the request is not authenticated during the first time period. In a further embodiment, the conditional access module generates a video signal for unscrambled transmission to the video device during a first time period, terminates the unscrambled transmission of the video signal at the expiration of the first time period, and continues with scrambled transmission of the video signal after the first time period.

20 Claims, 10 Drawing Sheets

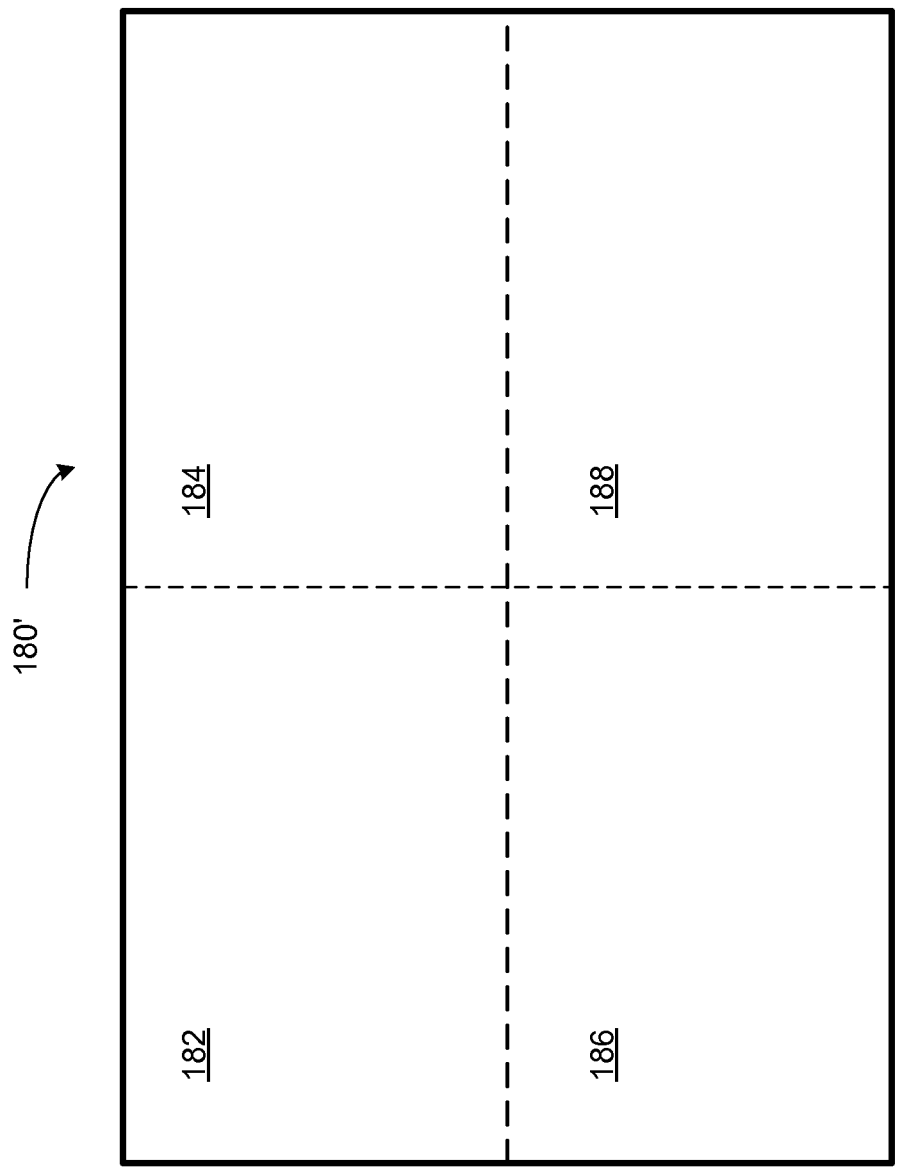

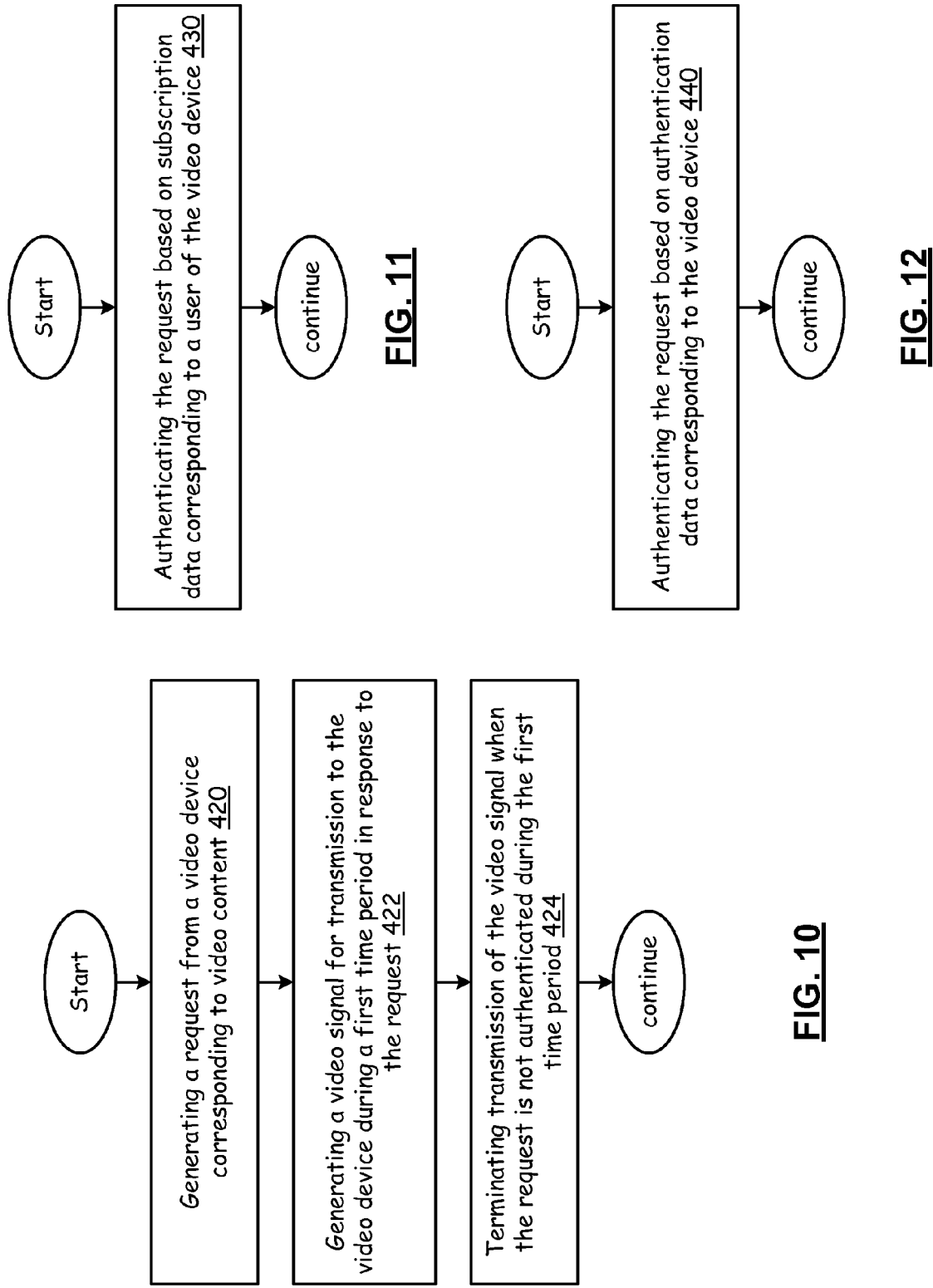

Figure 1:
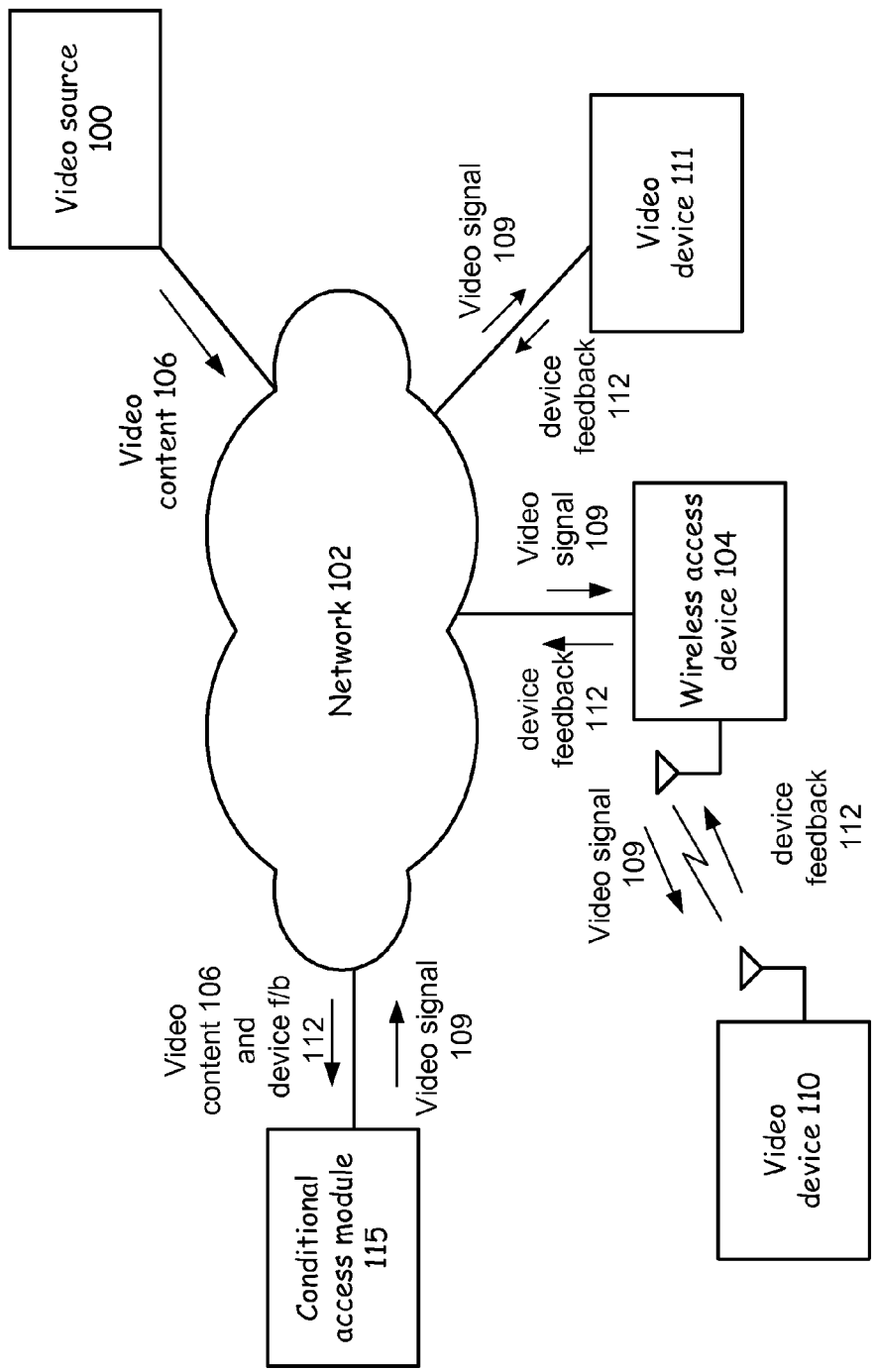

VIDEO PROCESSING SYSTEM WITH CONDITIONAL ACCESS MODULE AND METHODS FOR USE THEREWITH

CROSS-REFERENCE TO RELATED APPLICATIONS

The present application claims priority under 35 U.S.C. 119(e) to provisional patent application Ser. No. 61/054,722, filed May 20, 2008, expired, which is incorporated herein by reference in its entirety.

The present application is related to the following U.S. Patent Applications:

VIDEO PROCESSING SYSTEM WITH KEY TABLE AND METHODS FOR USE THEREWITH, having Ser. No. 12/190,076, filed on Aug. 12, 2008; abandoned and VIDEO DISPLAY DEVICE WITH CONTROLLABLE BACKLIGHT AND METHODS FOR USE THEREWITH, having Ser. No. 12/190,186, filed on Aug. 12, 2008, abandoned.

BACKGROUND OF THE INVENTION

1. Technical Field of the Invention

This invention relates generally to the transmission and processing of video signals and devices that use such video signals.

2. Description of Related Art

Communication systems provide several options for obtaining access to broadcast video content. Consumers can receive broadcast standard definition and high definition television broadcasts from the air with an antenna. Analog and digital cable television networks distribute a variety of television stations in most communities on a subscription basis. In addition, satellite television and new internet protocol (IP) television services provide other subscription alternatives for consumers. Analog video signals can be coded in accordance with a number of video standards including NTSC, PAL and SECAM. Digital video signals can be encoded in accordance with standards such as Quicktime, (motion picture expert group) MPEG-2, MPEG-4, or H.264. In addition to digital coding, some video signals are scrambled to provide access to these signals, only to the subscribers that have paid to access the particular content.

The desire for video content has driven cellular telephone networks to begin offering video programs to their subscribers as streaming video. In this fashion, users of mobile devices can have access to video programming on the go. Some of the technologies and techniques used in providing broadcast video content to stationary devices are not suitable for adaptation to the viewing environment associated with a handheld mobile device.

Power consumption is an important issue for portable devices. A video display device, such as liquid crystal display consumes a significant amount of power. In turn, a much of the power consumed by a liquid crystal display can be attributed to the backlight. However, operating without a backlight is only suitable for limited applications.

The limitations and disadvantages of conventional and traditional approaches will become apparent to one of ordinary skill in the art through comparison of such systems with the present invention.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

Figure 2:
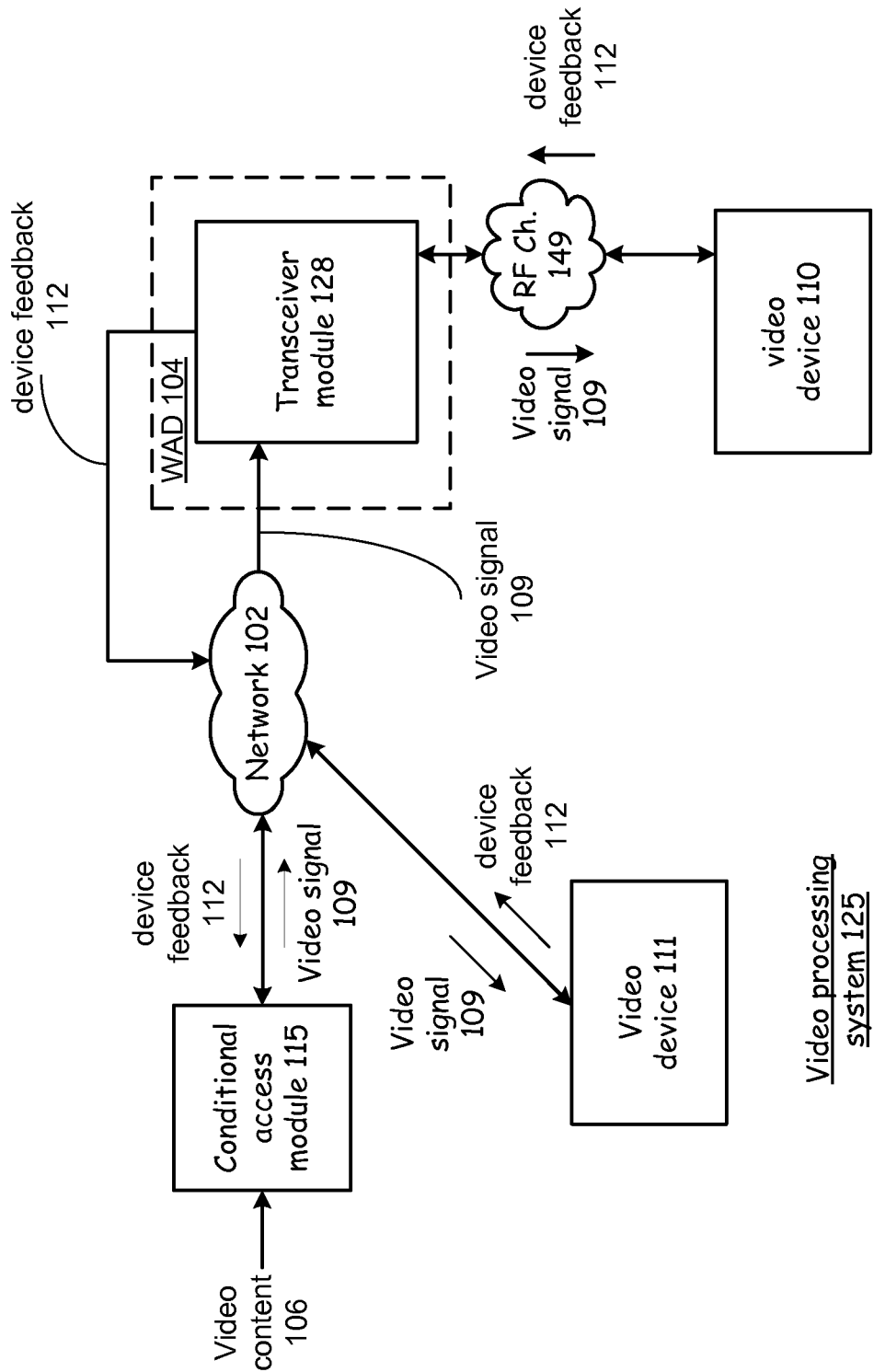
Figure 3:
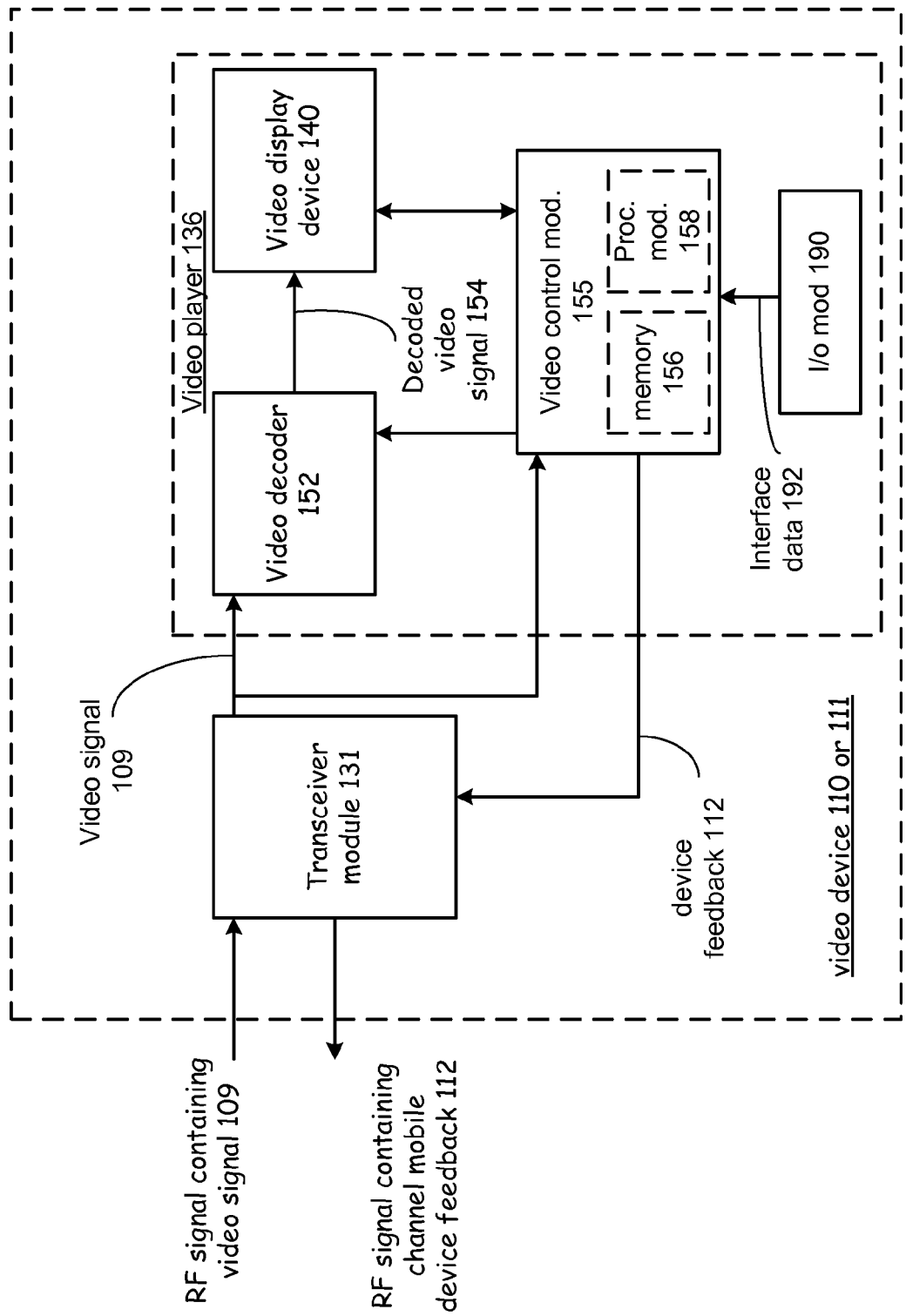
Figure 5:
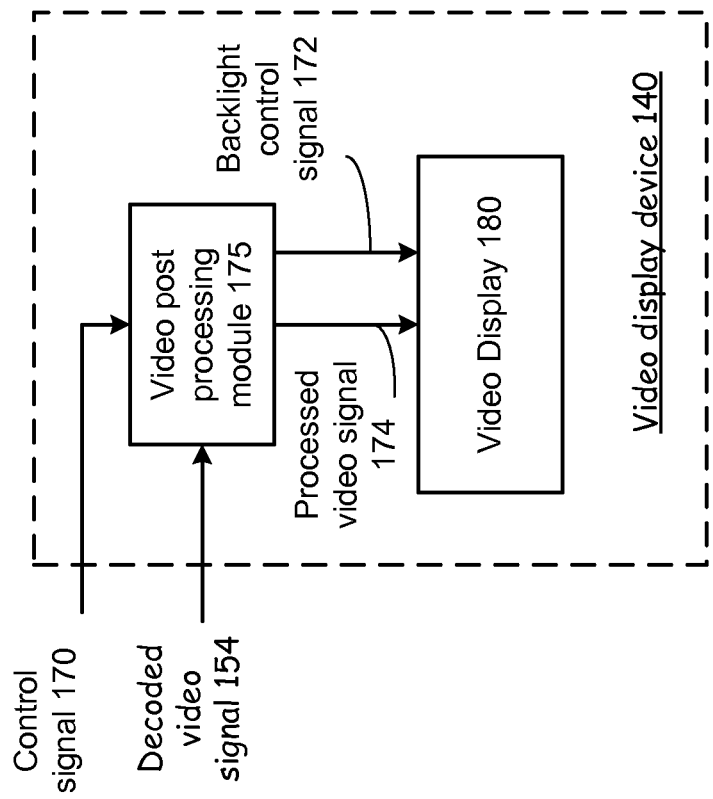
Figure 4:
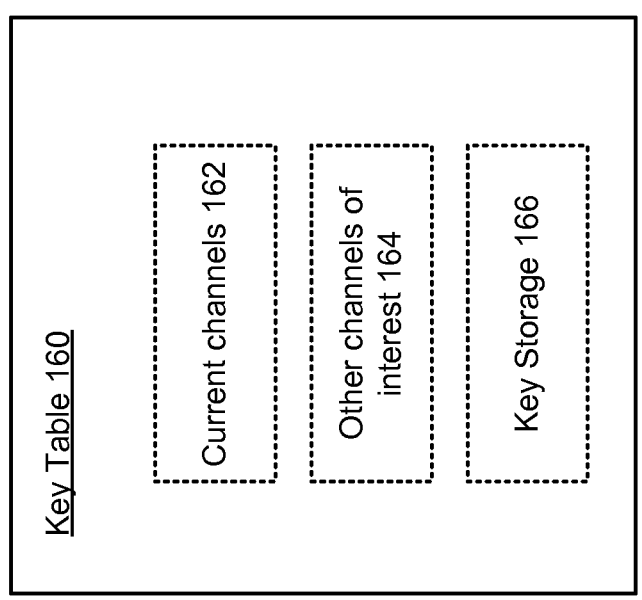
Figures 7, 8:
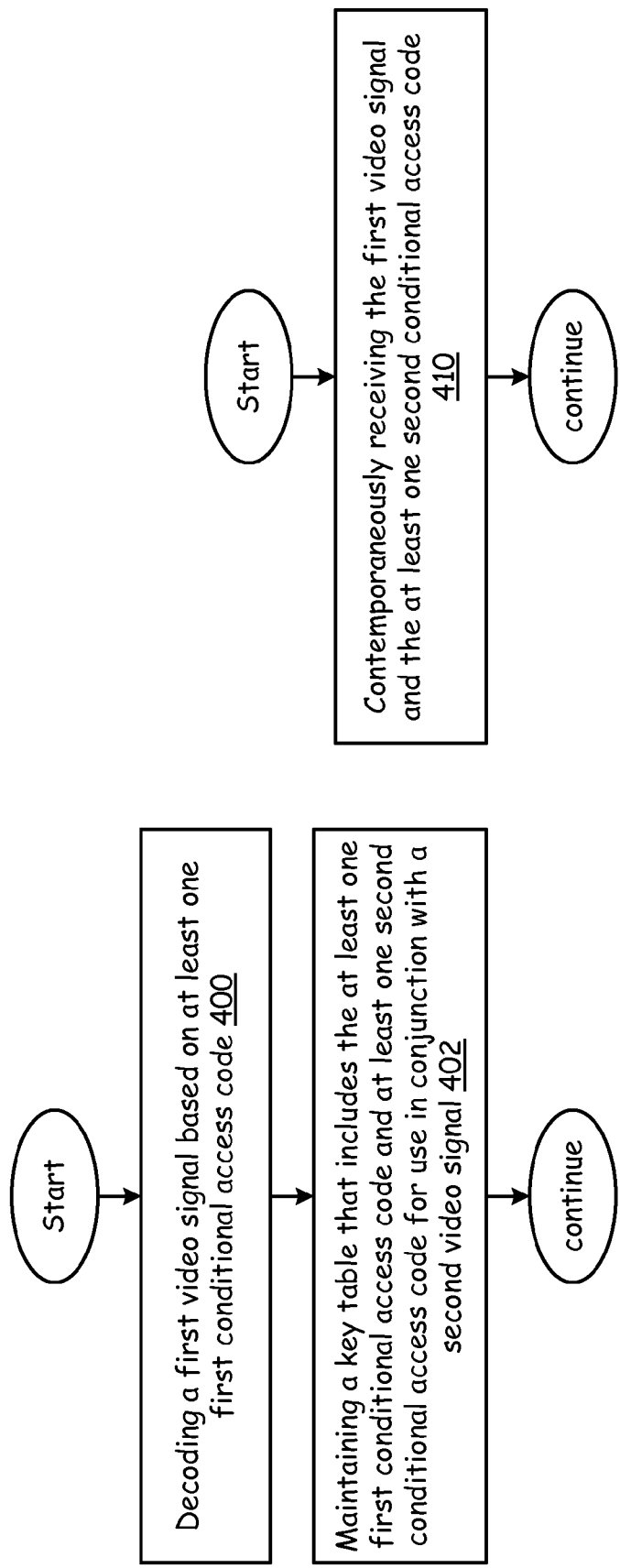
Figure 9:
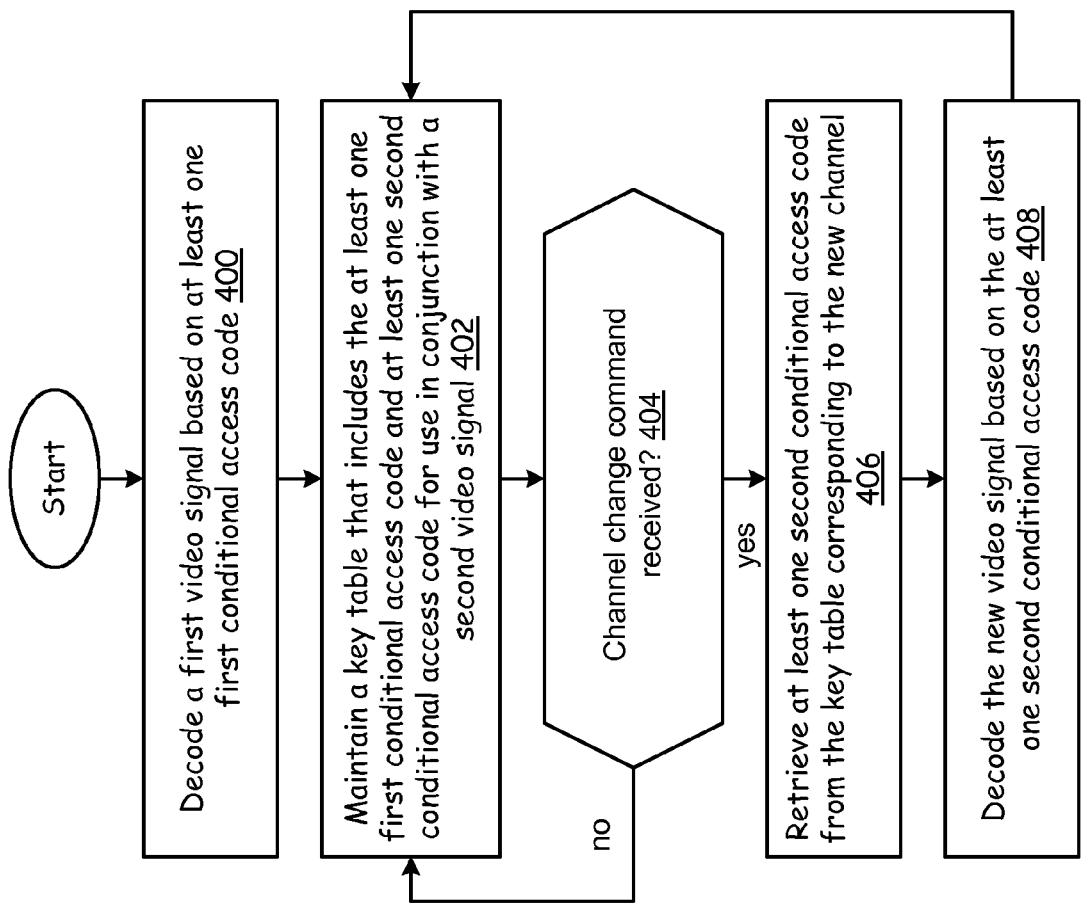
Figure 14:
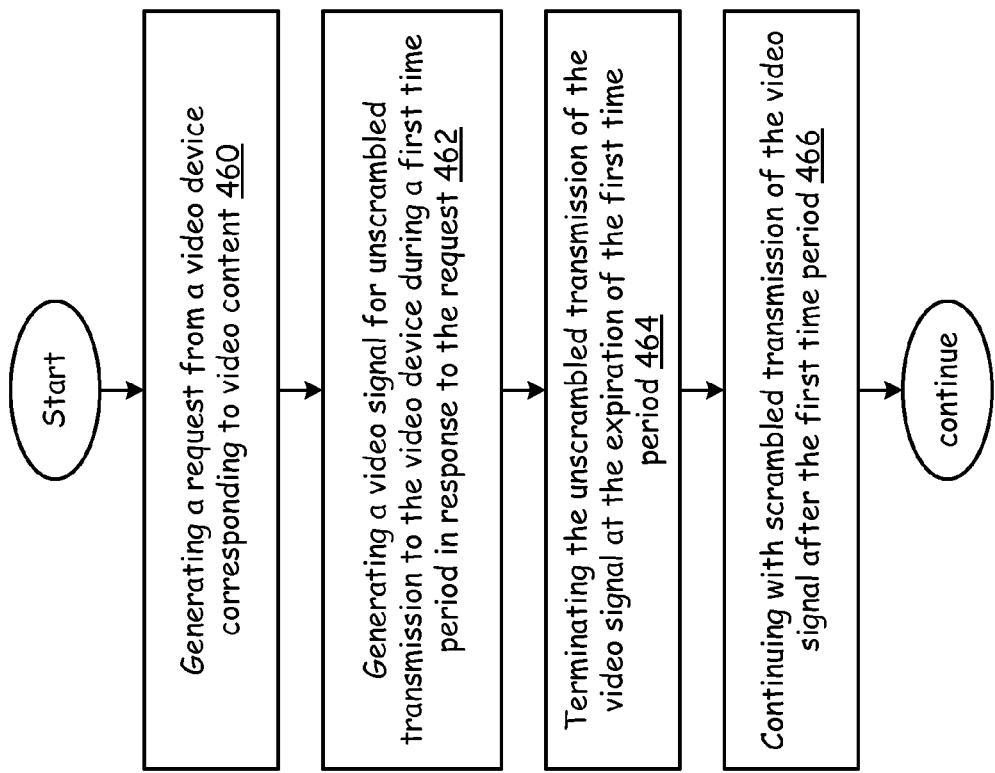
Figure 13:
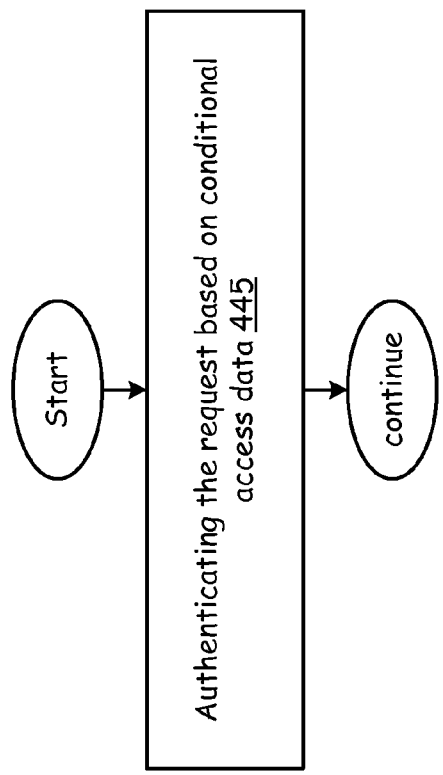
Figure 16:
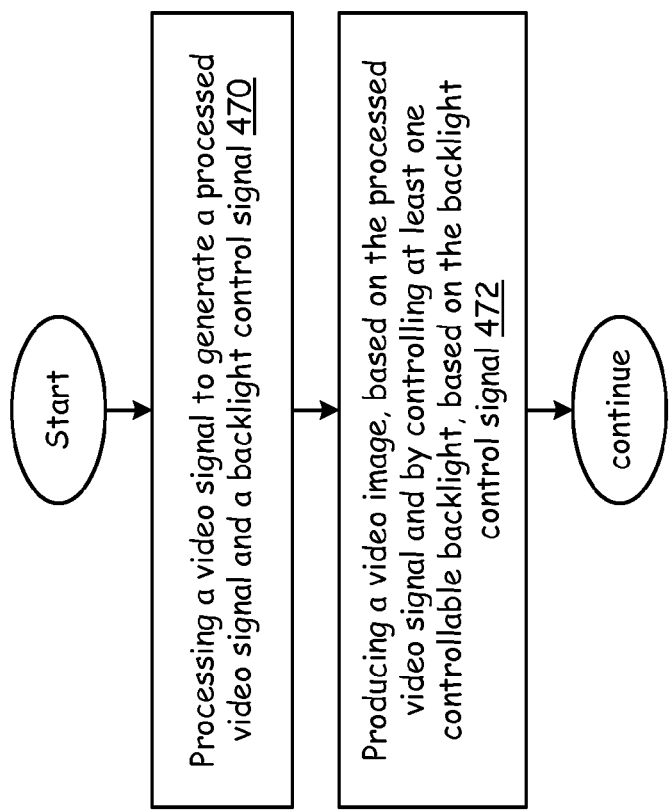
Figure 15:
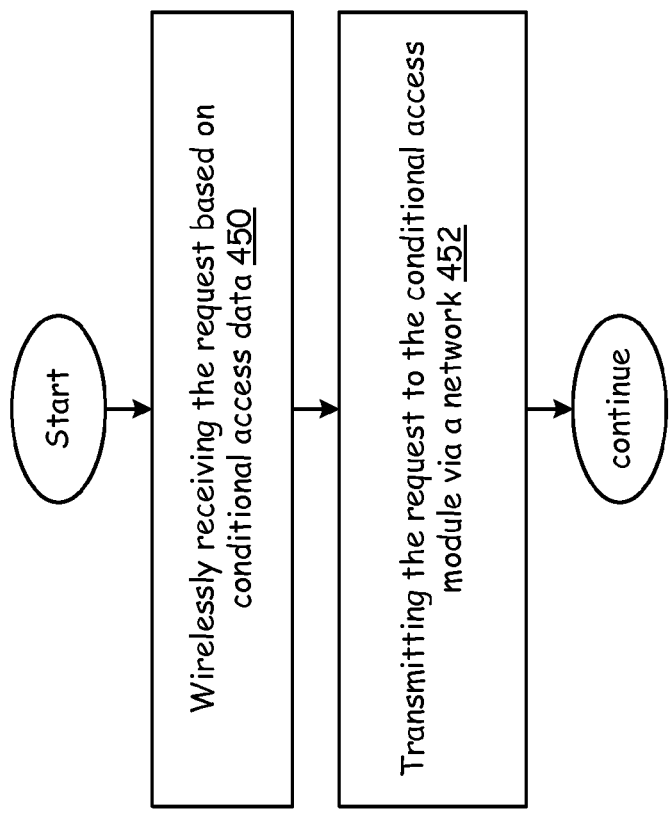

FIG. 1 presents a block diagram representation of a video network 102 in accordance with an embodiment of the present invention;

FIG. 2 presents a block diagram representation of a video processing system 125 in accordance with an embodiment of the present invention;

FIG. 3 presents a block diagram representation of a video device 110 or 111 in accordance with an embodiment of the present invention;

FIG. 4 presents a block diagram representation of a key table 160 in accordance with an embodiment of the present invention;

FIG. 5 presents a block diagram representation of a video display device 140 in accordance with another embodiment of the present invention;

FIG. 6 presents a pictorial representation of a video display 180' in accordance with another embodiment of the present invention;

FIG. 7 presents a flowchart representation of a method in accordance with an embodiment of the present invention;

FIG. 8 presents a flowchart representation of a method in accordance with an embodiment of the present invention;

FIG. 9 presents a flowchart representation of a method in accordance with an embodiment of the present invention;

FIG. 10 presents a flowchart representation of a method in accordance with an embodiment of the present invention;

FIG. 11 presents a flowchart representation of a method in accordance with an embodiment of the present invention;

FIG. 12 presents a flowchart representation of a method in accordance with an embodiment of the present invention;

FIG. 13 presents a flowchart representation of a method in accordance with an embodiment of the present invention;

FIG. 14 presents a flowchart representation of a method in accordance with an embodiment of the present invention;

FIG. 15 presents a flowchart representation of a method in accordance with an embodiment of the present invention; and FIG. 16 presents a flowchart representation of a method in accordance with an embodiment of the present invention.

DETAILED DESCRIPTION OF THE INVENTION

FIG. 1 presents a block diagram representation of a video network 102 in accordance with an embodiment of the present invention. A network 102 is shown that distributes information such as video content 106 from a video source 100 to a wireless access device 104 for wireless transmission to wireless video devices such as video device 110 or other video devices. The video content 106 can include movies, television shows, commercials or other ads, educational content, infomercials, or other program content and optionally additional data associated with such program content including but not limited to digital rights management data, control data, programming information, additional graphics data and other data that can be transferred in associated with program content. Video content 106 can include video with or without associated audio content. The video content 106 can be sent as broadcast video, streaming video, video on demand and near video on demand programming and/or other formats.

The network 102 can be a dedicated video distribution network such as a direct broadcast satellite network or cable television network that distributes video content 106 from a plurality of video sources, including video source 100, a plurality of wireless access devices and optionally wired devices over a wide geographic area. In the alternative, network 102 can be a heterogeneous network that includes one or more segments of a general purpose network such as the Internet, a metropolitan area network, wide area network, local area network or other network and optionally other networks such as an Internet protocol (IP) television network.

The video content 106 can be carried as analog signals such as National Television System Committee (NTSC), Séquentiel couleur à mémoire (SECAM) or Phase Alternating Line (PAL) coded video signals, or digital video signals such as Quicktime, (motion picture expert group) MPEG-2, MPEG-4, H.264, or other format, either standard or proprietary that are carried via an IP protocol such as TCP/IP, Ethernet protocol, Data Over Cable Service Interface Specifications (DOCSIS) protocol or other protocol.

Wireless access device 104 can include a base station or access point that provides video content 106 to a plurality of video subscribers over a cellular network such as an Universal Mobile Telecommunications System (UMTS), enhanced data rates for GSM evolution (EDGE), 3G, 4G or other cellular data network, a wireless local area network (WLAN) such as an 802.11a,b,g,n, WIMAX, or other WLAN network. In addition, the wireless access device can include a home gateway, video distribution point in a dedicated video distribution network or other wireless gateway for wirelessly transmitting video content 106, either alone or in association with other data, signals or services, to video device 110.

Video device 110 can include a video enabled wireless telephone or other handheld communication device, or other device with wireless connectivity via a wireless data card, wireless tuner, WLAN modem or other wireless link or device that alone or in combination with other devices is capable of receiving video content 106 from wireless access point 104 and storing and/or displaying the video content 106 for a user. Video device 111 is home video system including a television and set-top box, video receiver, digital video recorder, personal computer or other device or combination of devices that are capable of receiving video signals 109 from network 102 and providing device feedback 112

Conditional access module 115 operates to control the access to video content such as video content 106 by devices such as video device 110 or other video devices coupled to network 102. In particular, conditional access device generates, modifies or otherwise controls the distribution of video signal 109 in accordance with one or more conditional access techniques such as encryption or other scrambling, or other digital rights management to limit the unauthorized reception and/or dissemination of the video content, such as video content 106. Conditional access module 115 can be implemented in conjunction with a head-end, server, router, such as an edge router, switch, hub, gateway, interworking device or other network module that stores or receives a video stream or other video signal containing video content 106.

In an embodiment of the present invention, the conditional access module receives device feedback 112 such as a channel change requests or other requests to access video content, and optionally subscriber data, authentication data or other conditional access data that can be used in authenticating the request. In addition or in the alternative, conditional access module 115 can operate as part of a conditional access system that encrypts or otherwise scrambles the video signal 109. In addition, conditional access module 115 generates entitlement control messages and/or entitlement management messages that provide authority to view video signals such as video signal 109 and include keys such as control words used in decrypting or otherwise descrambling the video signal 109.

The network 102, video devices 110 and 111 and/or conditional access device 115 include one or more features of the present invention that will be described in greater detail in conjunction with FIGS. 2-16 that follow.

FIG. 2 presents a block diagram representation of a video processing system 125 in accordance with an embodiment of the present invention. A video processing system 125 is shown that can be used in conjunction with network 102.

Conditional access device 115 processes video content 106, to produce video signal 109, optionally based on device feedback 112. In an embodiment of the present invention, conditional access device 115 can include a video encoder or transcoder that is implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When conditional access device 115 is implemented with two or more devices, each device can perform the same steps, processes or functions in order to provide fault tolerance or redundancy. Alternatively, the function, steps and processes performed by conditional access device 115 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the conditional access device 115 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

Wireless access device 104 includes transceiver module 128 that creates RF signals containing the video signal 109 for transmission to video device 110 via one or more RF communication channels 149 or to video device 111 directly via network 102. As discussed above, conditional access device 115 can receive device feedback 112 from video device 110 via wireless access device 104 and from video device 111 via network 102.

In one mode of operation, a video device, such as video device 110 or 111 generates a request for video content that is received by conditional access module 115. This request can be a request by video device 110 or 111 to receive a unicast transmission such or to access a multicast transmission. In particular, this request can be sent via device feedback 112 or otherwise via network 102. In response, conditional access module 115, generates video signal 109 for transmission to the video device during a first time period either without authentication or with a minimal level authentication. This first time period can be 2 seconds, 5 seconds, 10 seconds, 30 seconds or some other and possibly greater or lesser period of time. If the conditional access module 115 cannot authenticate the request by the end of the first time period, conditional access module 115 terminates transmission of the video signal 109.

In this mode of operation, the video device 110 or 111 can quickly obtain access to the video content 106 while authentication is pending. If however, authentication is not received within the allowed time period, the transmission is terminated to prevent further access. In particular, the request can be triggered by a change of channels or other selection of particular video content. This mode of operation allows the user of a video device, such as video device 110 or 111 to quickly surf through a number of channels in a multi-channel or through a number of different video sources or through different video content without being bogged down by possibly latency associated with the authentication process. While an unauthorized user could access some video content, their access is limited to the first time period.

Conditional access module 115 can operate in accordance with various authentication methods. In particular authentication of the request can be based on receipt and processing of subscription data, such as user passwords, account balances, and other data corresponding to a user of the video device 110 or 111, authentication data, such as a device identification or other data associated with the video device itself, or based on other conditional access data such as other code words, passwords, keys or other data. The subscription data, authentication data or other conditional access data can be obtained directly from the video device 110 or 111 that generated the request, such as via device feedback 112 or received from a database that may be associated with conditional access module 115 or otherwise provided via a network, such as network 102.

In another mode of conditional access module 115 responds to a request for video content 106 by generating a video signal 109 for unscrambled transmission to the video device during a first time period. At the expiration of the first time period, the conditional access device 115 terminates the unscrambled transmission of the video signal 109 and continues with scrambled transmission of the video signal 109 after the first time period. In this mode of operation, a video device, such as video device 110 or 111, can quickly begin decoding the video signal 109 without authentication. However, the video device 110 or 111 can access the video content after the first time period expires only if it has the proper code word or encryption key to descramble the video signal 109. Again, while an unauthorized user could access some video content, their access is limited to the first time period.

In a further mode of operation, the conditional access module 115 can operate in a more traditional way and a video device, such as video device 110 or 111, or other devices on behalf of video devices 110 or 111, can maintain a key table to facilitate fast channel changes or to otherwise respond to more quickly to requests for new content, signal outages or other events. This mode of operation will be described in greater detail in conjunction with FIG. 3 that follows.

FIG. 3 presents a block diagram representation of a video device 110 or 111 in accordance with an embodiment of the present invention. Video device 110 includes a transceiver module 131 that receives RF signals containing the video signal 109 and that demodulates and down converts these RF signals to extract the video signal 109. In particular, transceiver module can communicate with wireless access device 104 or directly with network 102. Video player 136 includes a video decoder 152 that generates a decoded video signal 154 and a video display device 140, such as plasma display, LCD display, cathode ray tube (CRT), that either directly or via projection, creates a video display for an end-user. While video display device 140 is shown as being included in video device 110 or 111, video display device may be a television, monitor or other display device that is coupled to video device 110 or 111.

In addition, video device 110 or 111 includes a input/output module 190 and video player 136 includes a video control module 155 having a memory 156 and processing module 158 that executes an application for storing selected video signals 109 as a plurality of stored video files, for playing back these video files and for interacting with network 102 in conjunction with the selection, authentication, processing and play of video content such as video content 106 received via one or more video signals 109. Input/output module 190 is a user interface module that includes one or more buttons, a keyboard, keypad, a click wheel, touch screen, a microphone, speaker and/or other user interface devices that allow the video control module 155 to interact with the user by providing prompts either directly or via screen displays that are generated by video control module 155 and displayed on video display device 140, to receive commands and other interface data 192 in response to actions of a user of video device 110 or 111. In particular, video control module 155 can respond to actions of a user to generate a request for video content 106 as part of a channel change or other selection process that can be incorporated in device feedback 112 for transmission as an RF signal by transceiver module 131.

Various elements of video player 136 can be implemented in hardware, software or firmware. In particular embodiments, the video player 136 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video player 136 is implemented with two or more devices, each device can perform the same steps, processes or functions in order to provide fault tolerance or redundancy. Alternatively, the function, steps and processes performed by video player 136 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video player 136 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry.

In operation, video control module 155 can receive commands from a user to store a video signal 109 as a digital video file in memory 156. The user can also navigate the stored video files and a select a stored video file for playback. During playback, processing module 158 converts the stored video file to a video signal that is provided to video decoder 152 to generate a decoded video signal 154 for display on display device 140. I/O module 190 optionally provides one or more playback control buttons such as stop, pause, fast forward, rewind, slow motion, etc., that generate interface data 192 used by processing module 158 to control the playback of a stored video file in response to user commands. In addition, video control module 155 generates navigation data for each stored video file that can be used in a video navigation routine that allows a user to select a stored video file for playback based on the navigation data and based on interface data 192 generated in response to the action of a user.

In an embodiment of the present invention, the navigation data includes a still image or video clip, such as an opening shot, a title shot, an opening clip or other still image or video clip derived from the one of the plurality of stored video files or some other graphics object or graphics data such as an icon, animation, or other graphical representation. The navigation data is stored in association with the corresponding stored video file and used to generate selectable prompts displayed on video display device 140, such as thumbnail clips or images of the stored video files. These selectable prompts can then be selected by the user via a touch screen, pointer or other selection mechanism of I/O module 190.

In a similar fashion, navigation data received by video device 110 or 111 via transceiver 131 can relate to one or more instances of video content 106 and be used by video device 110 to navigate and select programs to watch. For instance, when network 102 includes broadcast video programming, video control module 155 can implement an application that includes an electronic program guide that facilitates the user selection and requests for video content, such as video content 106, via data transmitted to video device 110 or 111 over network 102. In addition, other navigation and/or selection data can be provided to video device 110 or 111 to facilitate the selection of unicast, multicast or other video content 106 to facilitate a user's formulation of requests to access such video content.

As discussed in conjunction with FIG. 2, video device 110 or 111 can also generate device feedback 112 that includes subscription data, authentication data and/or other conditional access data used by conditional access module 115 to authenticate access by video device 112 to video content 106 of video signal 109. In operation, video control module 155 includes a secure access application that coordinates the generation and transmission of such device feedback 112.

In another mode of operation, video control module 155 maintains a key table that includes conditional access codes that can be provided to video decoder 152 for decoding the current video signal 109. In this mode of operation, the video decoder 152 operates, not only to decompress the video signal 109 based on a particular digital video standard such as AVC, H.264 or MPEG-2, video decoder descrambles the video signal 109 based on one or more conditional access codes to produce decoded video signal 154.

In addition to storing conditional access codes for the video signal 109 for current decoding, the key table can store one or more additional conditional access codes for use in conjunction with accessing other video signals. In particular, a secure access application of video control module 155 operates to store and update a plurality of conditional access codes for not only relating to the particular programming being decoded, but relating to other programming that may be or can possibly be accessed by the video device 110 or 111. In this fashion, should a user wish to switch channels from a current video signal 109 to a new video signal 109 or otherwise switch to viewing other content, a conditional access code for that content can be retrieved by the video control module 155 locally from the key table to facilitate a more rapid initiation of the decoding of the new video signal 109.

In an embodiment of the present invention, transceiver module 131 is operable to receive entitlement control messages and/or entitlement management messages that contain information relating to the authorization of video device 110 to access video signal 109 in addition to other video signals and content from network 102. In particular, conditional access codes in the form of code words or other encryption keys used in the decoding/descrambling of such video signals and content are received and stored in the key table and automatically updated, to the extent such conditional access codes periodically expire. In operation, the transceiver module 131 can include a dual mode receiver or other receiver that contemporaneously receives the video signal 109 and conditional access codes corresponding to other video signals or content. For example, in a broadcast video system with multiple video content channels, transceiver module 131 can include a receiver for receiving the current channel including the conditional access codes for the current channel, and another receiver that can be selectively tuned to skim other channels of interest for conditional access codes of these other channels for storage in the key table. In another embodiment, transceiver module 131 can include a separate data receiver or other receiver for obtaining conditional access codes for other video content while contemporaneously receiving an RF signal containing video signal 109.

Further details including several optional functions and features of such a key table will be decried in conjunction with FIG. 4.

FIG. 4 presents a block diagram representation of a key table 160 in accordance with an embodiment of the present invention. In particular, a key table 160 is presented that can be stored in memory 156 of video control module 155 and used in conjunction with and a broadcast video network having a plurality of channels. In the alternative, key table 160 can be stored in a network device such as a edge router, server or other network module on behalf of video device 110 and 111 and or otherwise accessible by network device 110 or 111. As shown, key table 160 maintains lists of one or more current channels 162 that are currently being decoded, other channels of interest 164 as well as key storage 166 for storing the conditional access codes associated the current channels 162 and other channels of interest 164. As discussed in conjunction with FIG. 3, the key table 160 is updated to contain current conditional access codes to the extent the access codes periodically expire.

If feasible, the key table 160 can maintain conditional access codes for all possible broadcast channels, in an embodiment of the present invention, the other channels of interest 164 can include frequently selected channels, particular channels designated as user favorites in response to selections by the user or other user-designated channels, one or more previously viewed channels such as the last-viewed channel, and/or predetermined channels such as a premium channel, emergency services channel, reserved channel or other channels of special interest.

In operation, the video control module 155 updates the key table 160 based on the qualification of a broadcast channel as a frequently selected channel, the qualification of a broadcast channel as a previously viewed or last-viewed channel and/or a user selection of a broadcast channel as a favorite channel or otherwise as a channel for inclusion in the key table 160. In response to a channel change command of the user of video device 110 or 111 to a new channel, the video control module 155 retrieves the conditional access code or codes from the key table 160, and these conditional access codes to the video decoder 152 for decoding/descrambling the new channel.

FIG. 5 presents a block diagram representation of a video display device 140 in accordance with another embodiment of the present invention. In this particular embodiment, a video post processing module 175 processes a video signal, such as decoded video signal 154, to generate a processed video signal 174 and a backlight control signal 172. A video display 180, such as a liquid crystal display or other backlit display device includes one or more controllable backlights that are controlled based on the backlight control signal 172. The video display 180 produces a video image based on the processed video signal 174.

In an embodiment of the present invention, the controllable backlights are implemented with incandescent bulbs, fluorescent tubes, light emitting diodes, electroluminescent panels or other light sources having a backlight brightness that is controlled, based on the backlight control signal that can selectively decrease a backlight voltage or current. The video post processing module 175 analyzes a picture, such as a frame or field of a video signal or a sequence of frames or fields of the video signal. The video post processing module 175 determines a peak luminance for the picture or pictures and generates the processed video signal and the backlight control signal, based on the peak luminance.

For example, the video post processing module 175 can determine that the luminance for a picture or sequence of pictures peaks at a value L, that is less than the maximum possible luminance Lmax. Video post processing module 175 can generate a backlight control signal 172 to scale the brightness of the backlight by L/Lmax while scaling upward the luminance values on the processed video signal 174 by Lmax/L to compensate for the dimmer backlight. The total effect can be the display of the pictures or pictures with the same luminance as intended by the decoded video signal 154, however, with a conservation of power caused by a decrease in backlight voltage and/or current. Based on the maximum speed that the backlight brightness can be controlled, the video post processing module 175 can optionally generate the processed video signal 174 and the backlight control signal 172 on a picture by picture basis.

In an embodiment of the present invention, video post processing module 175 can be selectively bypassed/disable in a normal mode and activated/enabled in a low power mode in response to control signal 170 generated by video control module 155. In particular, when video post processing module 175 is activated/enabled, video display 180 operates based on processed video signal 174 and a variable backlight control signal 172. When video post processing module 175 is bypassed/disabled, video display 180 operates directly on decoded video signal 154 with backlight control signal 172 fixed at a value corresponding to maximum backlight brightness.

The video post processing module 175 can be implemented in hardware, software or firmware. In particular embodiments, the video post processing module 175 can be implemented using one or more microprocessors, micro-controllers, digital signal processors, microcomputers, central processing units, field programmable gate arrays, programmable logic devices, state machines, logic circuits, analog circuits, digital circuits, and/or any devices that manipulates signals (analog and/or digital) based on operational instructions that are stored in a memory module. When video post processing module 175 is implemented with two or more devices, each device can perform the same steps, processes or functions in order to provide fault tolerance or redundancy. Alternatively, the function, steps and processes performed by video post processing module 175 can be split between different devices to provide greater computational speed and/or efficiency. The associated memory module may be a single memory device or a plurality of memory devices. Such a memory device may be a read-only memory, random access memory, volatile memory, non-volatile memory, static random access memory (SRAM), dynamic random access memory (DRAM), flash memory, cache memory, and/or any device that stores digital information. Note that when the video post processing module 175 implements one or more of its functions via a state machine, analog circuitry, digital circuitry, and/or logic circuitry, the memory module storing the corresponding operational instructions may be embedded within, or external to, the circuitry comprising the state machine, analog circuitry, digital circuitry, and/or logic circuitry. It should be noted that the functionality of video post processing module 175 can be incorporated in video decoder 152.

FIG. 6 presents a pictorial representation of a video display 180' in accordance with another embodiment of the present invention. While the embodiment of FIG. 5 focused on a display device 180 with a backlight that was only controllable for the entire screen, an embodiment is presented with display device 180' with a plurality of display segments 182, 184, 186 & 188 with corresponding controllable backlights that are individually controlled in response to the backlight control signal 172. In this embodiment, each of the display segments 182, 184, 186 and 188 can be individually controlled a treated as an entire screen display as described in conjunction with FIG. 5.

For example, the video post processing module 175 can determine that the luminance of segment i for a picture or sequence of pictures peaks at a value $L_i$, that is less than the maximum possible luminance $Lmax_i$. Video post processing module 175 can generating a backlight control signal 172 for each segment i=1, 2, 3, 4 to scale the brightness of the backlight by $L_i/Lmax_i$ while scaling upward the luminance values on the processed video signal 174 for each segment i=1, 2, 3, 4 by $Lmax_i/L_i$ to compensate for the dimmer backlight. As in the embodiment of FIG. 5, the total effect can be the display of the pictures or pictures with the same luminance as intended by the decoded video signal 154, however, with a conservation of power caused by a decrease in backlight voltage and/or current. Based on the maximum speed that the backlight brightness can be controlled, the video post processing module 175 can optionally generate the processed video signal 174 and the backlight control signal 172 on a picture by picture basis. It should be noted that, while display device 180' is shown with four display segments 182, 184, 186 and 188, a greater or lesser number of display segments can likewise be implemented and individually controlled in accordance with the present invention.

FIG. 7 is a flowchart representation of a method in accordance with the present invention. In particular, a method is presented for use in conjunction with one or more of the functions and features described in conjunction with FIGS. 1-6. In step 400, a first video signal is decoded based on at least one first conditional access code. In step 402, a key table is maintained that includes the at the at least one first conditional access code and at least one second conditional access code for use in conjunction with a second video signal.

In an embodiment of the present invention, the key table includes a plurality of conditional access codes corresponding to a plurality of broadcast channels. The plurality of broadcast channels can include at least one of, a frequently selected channel, a user-designated channel, a last-viewed channel, and a predetermined channel. The at least one first conditional access code can include a first encryption key for descrambling the first video signal and the at least one second conditional access code can include a second encryption key for descrambling the second video signal. Step 402 can include automatically updating the key table based on at least one entitlement control message, and/or updating the key table based on at least one of, the qualification of a broadcast channel as a frequently selected channel, the qualification of a broadcast channel as a last-viewed channel, and a user selection of a broadcast channel for inclusion in the key table. Step 400 can include descrambling the first video signal based on the at least one first conditional access code at least one first conditional access code and decompressing the first video signal based on a video compression format.

FIG. 8 is a flowchart representation of a method in accordance with the present invention. In particular, a method is presented for use in conjunction with one or more of the functions and features described in conjunction with FIGS. 1-7. In step 410, the first video signal and the at least one second conditional access code are contemporaneously received.

FIG. 9 is a flowchart representation of a method in accordance with the present invention. A method is presented for use in conjunction with one or more of the functions and features described in conjunction with FIGS. 1-8 and that includes similar elements presented in conjunction with FIG. 7 that are referred to by common reference numerals. Further, a method is presented wherein the first video signal corresponds to a first broadcast channel and the second video signal corresponds to a second broadcast channel. In addition, this method determines if a channel change has occurred as shown in decision block 404. If no, the method returns to step 402. Otherwise the method continues to steps 406 and 408 before returning to step 402. In step 406, the at least one second conditional access code is retrieved from the key table. In step 408, the second video signal is decoded based on the at least one second conditional access code.

FIG. 10 is a flowchart representation of a method in accordance with the present invention. In particular, a method is presented for use in conjunction with one or more of the functions and features described in conjunction with FIGS. 1-9. In step 420, a request is generated from a video device, the request corresponding to video content. In step 422, a video signal is generated for transmission to the video device during a first time period in response to the request. In step 424, transmission of the video signal is terminated when the request is not authenticated during the first time period. In an embodiment of the present invention, the request is triggered in conjunction with a channel change.

FIG. 11 is a flowchart representation of a method in accordance with the present invention. In particular, a method is presented for use in conjunction with one or more of the functions and features described in conjunction with FIGS. 1-10. In step 430, the request is authenticated based on subscription data corresponding to a user of the video device.

FIG. 12 is a flowchart representation of a method in accordance with the present invention. In particular, a method is presented for use in conjunction with one or more of the functions and features described in conjunction with FIGS. 1-11. In step 440, the request is authenticated based on authentication data corresponding to the video device.

FIG. 13 is a flowchart representation of a method in accordance with the present invention. In particular, a method is presented for use in conjunction with one or more of the functions and features described in conjunction with FIGS. 1-12. In step 445, the request is authenticated based on conditional access data.

FIG. 14 is a flowchart representation of a method in accordance with the present invention. In particular, a method is presented for use in conjunction with one or more of the functions and features described in conjunction with FIGS. 1-13. In step 460, a request is generated from a video device, the request corresponding to video content. In step 462, a video signal is generated for unscrambled transmission to the video device during a first time period. In step 464, the unscrambled transmission of the video signal is terminated at the expiration of the first time period. In step 466, the scrambled transmission of the video signal is continued after the first time period.

FIG. 15 is a flowchart representation of a method in accordance with the present invention. In particular, a method is presented for use in conjunction with one or more of the functions and features described in conjunction with FIGS. 1-14 wherein the video device is a video device. In step 450, the request is wirelessly received from the video device. In step 452, the request is transmitted to the conditional access module via a network.

FIG. 16 is a flowchart representation of a method in accordance with the present invention. In particular, a method is presented for use in conjunction with one or more of the functions and features described in conjunction with FIGS. 1-15. In step 470, a video signal is processed to generate a processed video signal and a backlight control signal. In step 472, a video image is produced, based on the processed video signal, and by controlling at least one controllable backlight, based on the backlight control signal.

In an embodiment of the present invention, the at least one controllable backlight controls a backlight brightness based on the backlight control signal. Step 470 can include generating the processed video signal and the backlight control signal on a picture by picture basis. Step 470 can include determining at least one peak luminance for a picture and generating the processed video signal and the backlight control signal, based on the peak luminance. Step 470 can include scaling a luminance of the picture based on the peak luminance of the picture. Step 470 can include generating the backlight control signal to scale a backlight brightness based on the peak luminance of the picture.

The at least one controllable backlight can include a plurality of controllable backlights that correspond to a plurality of display segments, and step 472 can include individually controlling the plurality of controllable backlights in response to the backlight control signal. Step 470 can include adjusting a luminance of the processed video signal for each of the plurality of display segments. Step 470 can include adjusting the luminance of the processed video signal for each of the plurality of display segments on a picture by picture basis. Step 470 can be selectively bypassed in response to a control signal.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), et cetera., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, et cetera, provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A video processing system comprising:
   a video device that generates a request corresponding to video content triggered by a channel change to a new broadcast channel; and
   a network conditional access module, coupled to the video device via a public telecommunications network, that generates a video signal for transmission to the video device via the public telecommunications network with a first authentication during a first time period, wherein a beginning of the first time period is triggered by the channel change, wherein a length of the first time period corresponds to authentication latency, and wherein the conditional access module terminates transmission of the video signal from the public telecommunications network to the video device when the request is not authenticated via a second authentication that is more stringent that the first authentication, during the first time period.

2. The video processing system of claim 1 wherein the channel change from a previous broadcast channel to the new broadcast channel.

3. The video processing system of claim 1 wherein the network conditional access module authenticates the request based on subscription data corresponding to a user of the video device.

4. The video processing system of claim 1 wherein the network conditional access module authenticates the request based on authentication data corresponding to the video device.

5. The video processing system of claim 1 wherein the network conditional access module authenticates the request based on conditional access data.

6. The video processing system of claim 1 wherein the video device is a wireless device and the video processing system further comprises:
   a wireless access device, coupled to wirelessly receive the request from the video device and to transmit the request to the network conditional access module via the public telecommunications network.

7. A method comprising:
   receiving a request from a video device, the request corresponding to video content triggered by a channel change to a new broadcast channel;
   generating a video signal for transmission with a first authentication to the video device via a public telecommunications network during a first time period in response to the request wherein a beginning of the first time period is triggered by the channel change, wherein a length of the first time period corresponds to an expected authentication latency; and
   terminating transmission of the video signal from the public telecommunications network to the video device when the request is not authenticated during the first time period via a second authentication that is more stringent that the first authentication.

8. The method of claim 7 wherein the channel change from a previous broadcast channel to the new broadcast channel.

9. The method of claim 7 further comprising:
   authenticating the request based on subscription data corresponding to a user of the video device.

10. The method of claim 7 further comprising:
    authenticating the request based on authentication data corresponding to the video device.

11. The method of claim 7 further comprising:
    authenticating the request based on conditional access data.

12. The method of claim 7 wherein the method further comprises:
    transmitting the request to a conditional access module via the public telecommunications network.

13. The video processing system of claim 1 wherein the first time period is less than 10 seconds.

14. The method of claim 7 wherein the first time period is less than 10 seconds.

15. A video processing system comprising:
    a network interface that receives a request, from a video device via a public telecommunications network, corresponding to video content triggered by a channel change to a new broadcast channel; and
    a network conditional access module, coupled to the network interface, that generates a video signal for transmission to the video device via the public telecommunications network with a first authentication during a first time period, wherein a beginning of the first time period is triggered by the channel change, wherein a length of the first time period corresponds to authentication latency, and wherein the conditional access module terminates transmission of the video signal from the public telecommunications network to the video device when the request is not authenticated via a second authentication that is more stringent that the first authentication, during the first time period.

16. The video processing system of claim 15 wherein the channel change from a previous broadcast channel to the new broadcast channel.

17. The video processing system of claim 15 wherein the network conditional access module authenticates the request based on subscription data corresponding to a user of the video device.

18. The video processing system of claim 15 wherein the network conditional access module authenticates the request based on authentication data corresponding to the video device.

19. The video processing system of claim 15 wherein the network conditional access module authenticates the request based on conditional access data.

20. The video processing system of claim 15 wherein the video device is a wireless device and the video processing system further comprises:
   a wireless access device, coupled to wirelessly receive the request from the video device and to transmit the request to the network conditional access module via the public telecommunications network.

* * * * *